United States Patent [19]
Moynagh

[11] Patent Number: 5,810,941
[45] Date of Patent: Sep. 22, 1998

[54] CLEANING METHOD FOR HIGH PRECISION MOLDING COMPONENTS

[76] Inventor: Kelan Thomas Moynagh, 14445 93rd Ave. SE., Yelm, Wash. 98597

[21] Appl. No.: 679,102

[22] Filed: Jul. 12, 1996

Related U.S. Application Data

[60] Provisional application No. 60/001,181 Jul. 14, 1995.
[51] Int. Cl.⁶ ........................................................ B08B 3/04
[52] U.S. Cl. .......................... 134/4; 134/6; 134/8; 134/10
[58] Field of Search ..................................... 134/2, 3, 4, 6, 134/7, 26, 27, 28, 29, 38, 41, 8, 10

[56] References Cited

U.S. PATENT DOCUMENTS

| | | | |
|---|---|---|---|
| 3,994,744 | 11/1976 | Anderle et al. | 134/4 |
| 4,455,636 | 6/1984 | Tsutsui et al. | 369/72 |
| 5,126,992 | 6/1992 | Lavinsky et al. | 369/71 |
| 5,208,795 | 5/1993 | Lavinsky et al. | 369/72 |
| 5,334,254 | 8/1994 | Gelardi et al. | 134/25.4 |
| 5,509,969 | 4/1996 | Grawe | 134/2 |

FOREIGN PATENT DOCUMENTS 189934  9/1985  Japan .

*Primary Examiner*—Laurie Scheiner
*Attorney, Agent, or Firm*—R. Reams Goodloe, Jr.

[57] ABSTRACT

A novel method for cleaning high precision optical equipment. The method involves applying a curable coating to an optical or optical forming surface which has been contaminated with undesirable foreign matter, then allowing the coating to dry to form a resilient dried film, and then removing the dried film to remove along therewith the undesirable foreign debris which has contaminated the optical surface. Preferably, the curable coating is formed from an aqueous polyurethane emulsion. The method allows foreign debris to be removed with a very high degree of reliability and completeness, so that when the method is used with compact disc stampers, the stampers are restored to a like new condition.

23 Claims, 2 Drawing Sheets

CLEANING METHOD FOR HIGH PRECISION MOLDING COMPONENTS

This application claims the benefit of U.S. Provisional application Ser. No. 60/001,181, filing date Jul. 14, 1995.

TECHNICAL FIELD OF THE INVENTION

This invention relates to a novel, improved method for cleaning high precision optical components, and more particularly, to a method of removing smudges, oil, dust, saliva, and other contaminants. The method is particularly useful for cleaning molds utilized in the production of compact discs.

BACKGROUND OF THE INVENTION

Compact discs ("CD's") are commonly manufactured in an injection molding process. In the process, a mold is used to replicate, with a high degree of accuracy and repeatability, the pit structure of a compact disc. For example, in a typical pit in a CD, the pit structure is about 0.5 microns wide, 125 nm deep, and of varying length, depending upon the bit pattern that is being replicated. In injection molding of CD's, two mold halves are utilized in order to form both the top and bottom of the CD. One-half of the mold is a mirror surface which is utilized to form the smooth or bottom side of a CD. The other one-half mold is an electroformed nickel platter that contains an exact mold replica of the pitted optical surface of the CD. This nickel platter is commonly referred to in the trade as a "stamper." The stamper is manufactured in a pre-production process called mastering and electroforming. Stampers are usually about 300 microns thick (0.3 mm). Stampers also usually have a hole punched in the center so that the stamper can be centered in the mold. Once a hole has been punched in the center, it may also be used for retaining purposes; i.e., via use of a retaining bushing, the stamper can be held in the mold. Stampers are prepared in the desired diameter and are trimmed at the outer edges according to the exact dimensions required by a particular mold. When a stamper and a mirror surface are utilized in an injection mold to form a CD, the resulting CD contains all of the information required for the final CD product.

Stampers are installed in and removed from molds according to production schedules. For example, to manufacture an order of five hundred (500) compact discs of a title XYZ, the stamper for the title XYZ is installed into the mold, and the desired five hundred discs are injection molded to fill the order. When the production run is complete, the stamper is removed from the mold and is stored for future use. Stampers may be utilized again and again during different production runs. For example, a single stamper may be utilized to manufacture over one hundred twenty five thousand (125,000) CDs during ten (10) or more production runs.

The fact that stampers are handled when setting up for production runs, and between production runs, results in the potential for damage to stampers due to a variety of causes. Because every small pit structure in the stamper is faithfully replicated during the molding process, any defects which are introduced in the optical surface of the stamper by foreign debris are also faithfully replicated. Introduction of such defects in the CD product can cause a variety of harmful results, ranging from cosmetic blemishes, to undesirable playback problems, or even to rendering the CD unplayable.

To avoid problems with defects in CDs due to foreign debris in a stamper, some plants are forced to discard the defective stampers and make or buy new stampers. However, some costs are incurred, which over time, may add up to considerable expense. For example, production of each stamper may cost anywhere from about $70 to about $450 or more. In addition, when stampers are not manufacture on-site, it may take several days or more to obtain a replacement stamper. Therefore, a plant may be faced with the unenviable problem of either using a less than perfect stamper or missing a production run delivery deadline.

Defects in CD's due to foreign debris, however, have heretofore been removed from a stamper to some limited extent. Foreign debris defects include finger prints, saliva, water marks, grease or oil from machinery, or residue from solvents such as acetone which are used in the stamper manufacturing or coating processes. Currently, manufacturers utilize a variety of techniques in an attempt to remove as much as possible of such foreign debris contamination. In larger plants where electroforming is done on site, dirty stampers are often returned to the electroforming department for cleaning with solvents and ultrapure water. Other plants utilize ultrasonic cleaners or other solvents in an attempt to remove foreign debris, but often have problems drying the stamper without leaving water spots where solids formerly dissolved in the water or other solvent have been left behind. Also, a number of other complex processes utilizing rather expensive machines, such as electrolysis or plasma etching techniques, are sometimes used to clean stampers. Such prior art methods known are generally (a) quite time consuming, (b) require expensive equipment, or (c) require highly trained personnel.

Therefore, it can be appreciated that a continuing demand exists for a simple, inexpensive method which can be utilized for removing foreign debris defects from CD stampers. Such a method would also be useful in enhancing the useful life and reliability of CD pre-production tools, including CD masters, CD fathers, and CD mothers, as can be appreciated by those skilled in the art and to which this specification is addressed.

SUMMARY OF THE INVENTION

I have now invented, and disclose herein, a novel, improved method for removal of foreign debris defects from optical surfaces such as CDs stampers, which method does not have the above-discussed drawbacks common to those heretofore used methods of which I am aware. Unlike the cleaning methods heretofore available, my method is simple, relatively inexpensive, easy to utilize, and is otherwise superior to the heretofore proposed methods known to me.

I have developed a novel cleaning method for removing foreign debris from a CD stamper, to restore such stampers to their pre-marred condition or better. The cleaning method will remove any residue from the electroplating process used to manufacture the stamper, and will remove adhesives which are used for stamper protection. Importantly, my novel method has been demonstrated to improve BLER values and other digital counts of "as delivered" stampers.

My method involves cleaning the obverse, optical forming surface of a stamper us ed for production of compact digital discs to remove foreign debris which is present on the optical forming surface. This prevents foreign debris defects when the stamper is used to produce compact discs. In practicing the method, the stamper placed in a spin applicator unit and rotated at about twenty (20) to thirty (30) revolutions per minute, while applying a curable cleaning solution to the optical forming surface of the stamper. Preferably, the cleaning solution is applied at or near the inner edge or inner diameter of the annulus shaped compact disc. Also, after application of the cleaning solution, it is desirable to rotate the stamper at high speed, up to about three hundred (300) revolutions per minute, to insure that the cleaning solution coating is applied evenly. Then, the stamper is preferably removed from the spin applicator before curing the coating. In one embodiment, the curing step can be accelerated by heating the stamper with hot air after the stamper has been removed from the spin applicator unit. Then, the cleaning solution is cured to form a resilient, dry film on the optical forming surface. Finally, the resilient dried film is removed from the optical forming surface.

To remove the resilient dry film from the optical forming surface, it is easiest to scrape a tool against an outer edge portion of the stamper, so as to delaminate the film from the stamper along the outer edge portion of the stamper. Then, an adhesive tape is applied to the resilient dry film on the optical forming surface. Finally, the adhesive tape is pulled so as to delaminate the resilient dry film from the optical forming surface, and to pull along with the dry film the foreign debris which is encapsulated in the dry film.

Preferably, the film forming cleaning solution is a curable elastomeric material, and more preferably, is a curable urethane emulsion. Most preferably, the curable cleaning solution comprises about seventy seven point five (77.5) to about eighty two point five (82.5) percent by weight of urethane emulsion resin. Also, the cleaning solution preferably comprises a butyl cellusolve solvent, most preferably with about ten (10.0) to about fourteen (14.0) percent water by weight. The use of a dual solvent system (water and butyl cellusolve) where the solvents have solubility in each other as well as the ability to solubilize a variety of solutes which may be present as foreign debris on the optical surface being decontaminated, is believed to contribute to the outstanding results provided by my novel cleaning method. Moreover, the ability of my curable emulsion cleaning solution to encapsulate foreign debris and remove the same along with the cured emulsion film itself, without leaving behind undesirable emulsion residue, is a significant improvement in the art of manufacturing compact discs.

OBJECTS, ADVANTAGES, AND NOVEL FEATURES

From the foregoing, it will be apparent to the reader that one important and primary object of the present invention resides in the provision of a novel, improved method to provide a means for removal of foreign debris from a CD stamper.

Other important but more specific objects of the invention reside in the provision of a method as described in the preceding paragraph which:

allows removal of dust, finger prints, saliva, water marks, oil, and grease from a stamper;

is relatively simple and easy to perform;

is relatively inexpensive;

is relatively quick;

allows a marred stamper to be cleaned and restored to a pre-marred condition and effectively removes all foreign debris from a stamper.

Other important objects, features, and additional advantages of my invention will become apparent to the reader from the foregoing and the appended claims and as the ensuing detailed description and discussion proceeds in conjunction with the accompanying drawing.

BRIEF DESCRIPTION OF THE DRAWING

In the drawing.

Within the various figures, like parts have been noted with common reference numerals without further discussion thereof.

DETAILED DESCRIPTION OF THE INVENTION

Figure 1:
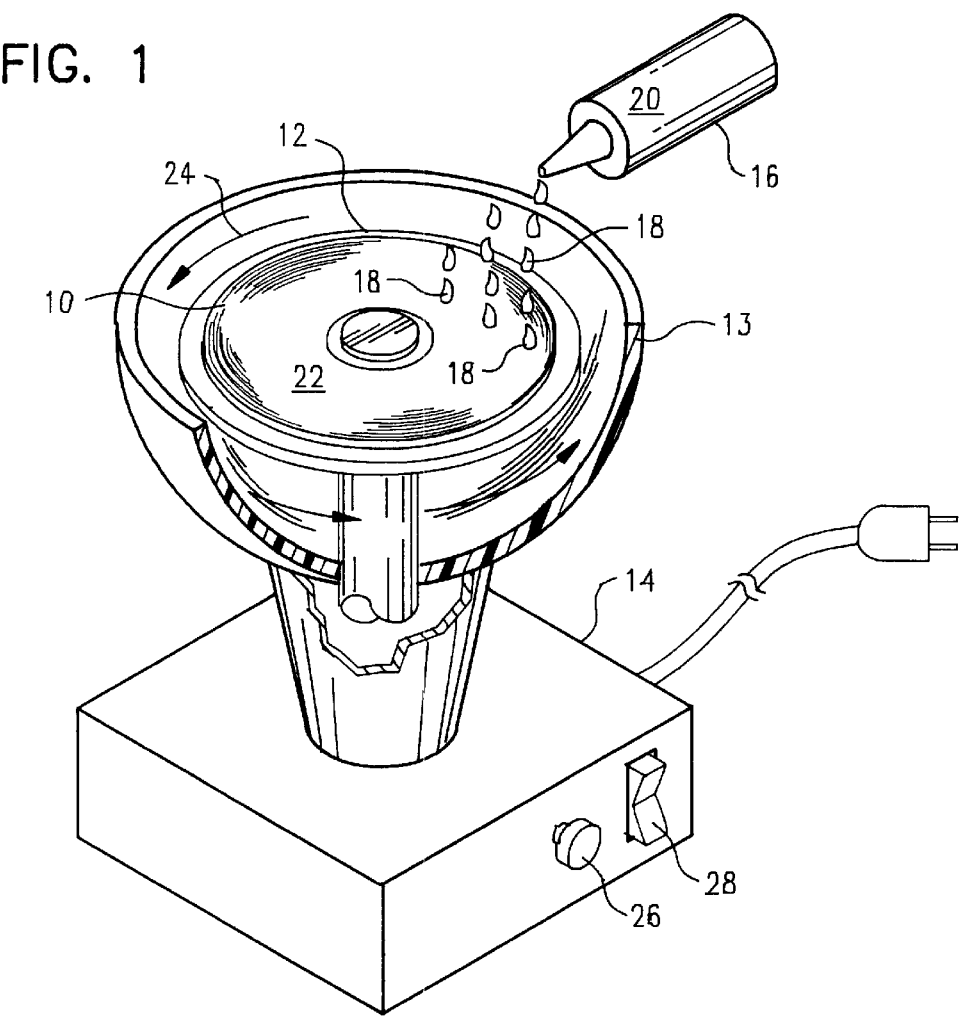
FIG. 1 is a partially broken away front perspective view showing a CD stamper in an apparatus used for spin coating, with the cleaning solution used in my novel method being applied to the CD stamper while the CD is spinning.

Referring now to the drawing, FIG. 1 depicts, in its operative position, a CD stamper 10 in position on the turntable 12 in the bowl 13 of a spin coater 14. Any commonly used spin coater 14 will likely be workable. A dispenser 16 is provided allow a stream 18 of cleaning solution 20 to fall by gravity to the working or CD optical forming surface 22 of stamper 10. The optical forming surface 22 may be contaminated with any one or more contaminants, such as water marks, solvent residue such as acetone or alcohol, fingerprints, saliva, grease or oil, or even residue from fingernail marks or the like. Even polycarbonate specs can be removed by using acetone to remove or dissolve the polycarbonate, and then using my cleaning solution to clean up the residue. Best cleaning results are achieved if the cleaning solution 20 is applied to the surface 22 without formation of bubbles. Therefore, dispensing cleaning solution 20 while the CD stamper 10 is rotated (reference numeral 24) at a velocity of twenty (20) to thirty (30) revolutions per minute (RPM) is desirable until there is enough of the cleaning solution 20 provided to amply coat the surface 22 of stamper 10. Then, the rotational speed of stamper 10 should be increased via speed control 26 to ensure that the entire surface 22 of stamper 10 is coated. Finally, it is often helpful to utilize a quick final spin at about three hundred (300) RPM to even out the thickness of the cleaning solution 20 which is provided on the surface 22 of stamper 10. Overall, it is desirable to leave ample amounts of cleaning solution 20 on the surface 22 of stamper 10. This is because most of the cleaning solution 20 will evaporate during drying, and in order to provide adequate strength to the cured cleaning film coating, a generous layer of cleaning solution 20 must be provided.

It is preferable not to dry the cleaning solution 20 when spinning the stamper 10 in the spin coater 14. Rather, it is preferably to turn off spin coater 14 via off switch 28 and remove the stamper 10 from the spin coater 14 to allow the cleaning film to dry. For normal curing of the cleaning solution 20 on the surface 22 of stamper 10, the stamper 10 should be placed in a warm, well ventilated area. Air drying on warm surfaces or ovens will normally work quite well. In CD production, one useful location is on top of the running mold temperature controller. Normally, drying time for the air dry technique is about twelve (12) to fifteen (15) minutes.

For accelerated curing, additional heating can be provided. One useful method is to utilize a high intensity light or heat lamp (not shown) When using such equipment, drying times of five (5) minutes or less are achievable. Also, a hair dryer or industrial hot air blower (not shown) may be used to dry the cleaning solution by intermittently directing hot air to the mirror surface (reverse side) and to the optical forming surface 22 (obverse side) of the CD stamper 10. Other convenient heating sources, such as a small oven (toaster or other type), can be used, and the stamper 10 is preferably heated to between 175° F. and 200° F. The stamper 10 should not be overheated so as to cause the cleaning solution to boil. Rather, it is desirable to cause slow evaporation of water and solvent from the cleaning solution on surface 22. Therefore, it should be appreciated that any "hot plate" surface should be maintained below about 200° F. Drying times of about one and one-half (1.5) to two (2) minutes can be achieved when utilizing accelerated drying and curing techniques.

Liquid cleaning solution 20 is foggy or white in color during the spin coating of surface 22 of stamper 10. When a film 30 has formed on surface 22 and it is dried and cured, the film 30 turns clear or colorless. The stamper 10 should be cooled, preferably to about room temperature if possible, before attempting removal of film 30. Unfortunately, film 30 is not easily removed if the stamper 10 remains quite warm.

Figure 2:
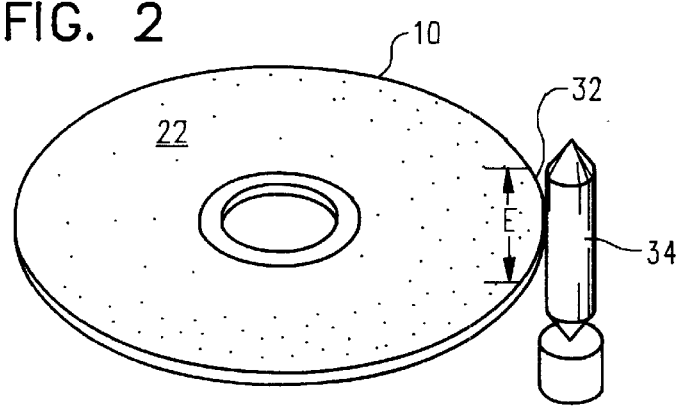
FIG. 2 is a perspective view of a CD stamper showing the stamper having a dried film thereon, which is being prepared for removal via addition of a small section of adhesive tape.
Figure 4:
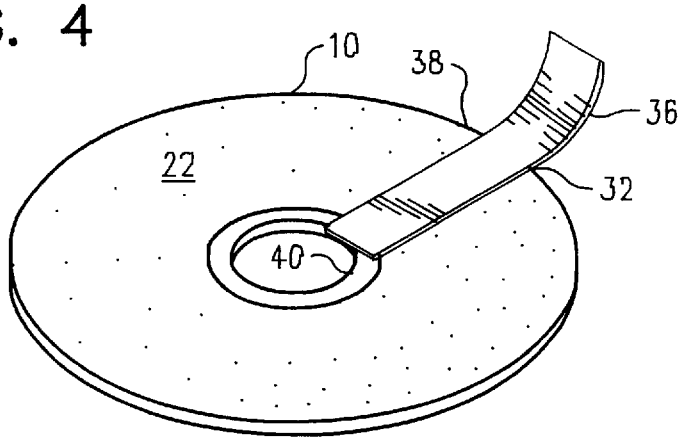
FIG. 4 is a perspective view of a CD stamper showing the use of adhesive tape as a method for providing an upward force on the cured film in order to delaminate the cured cleaning film coating from the stamper.
Figure 5:
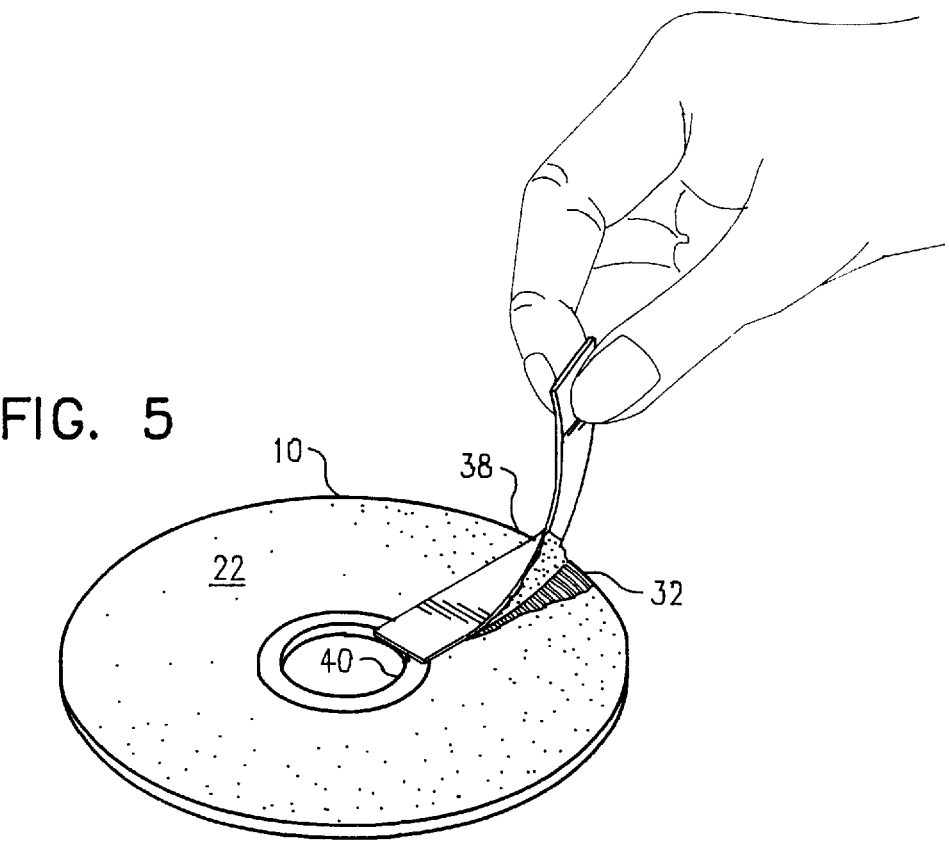
FIG. 5 is a perspective view of a CD stamper showing the process of removal of a dried cleaning film therefrom.

Attention is now directed to FIGS. 2, 4, and 5, where removal of film 30 is illustrated. One of the most effective means of starting the coating removal process is to rub the outer edge 32 of the stamper with any convenient tool 34 (such as a knife) along a one (1) to two (2) inch circumference E, to delaminate, open up, and thus expose an interface edge portion 33 between the coating film 30 and the surface 22. Next, apply some tape 36 (such as Scotch brand adhesive tape, although most any strong adhesive or packaging tape will usually be adequate) to the cured coating film 30 on the surface 22 of stamper 10, in a position which extends across the outer edge 32 just opened up. Then, pull the tape 36 from the outer edge 32 to the inside edge 40 very slowly, as the coating film 30 begins to delaminate from surface 22. Preferably, a delamination seam 42 is worked across an entire radius of a stamper 10 and then is worked around the entire surface 22 of stamper 10.

Figure 3:
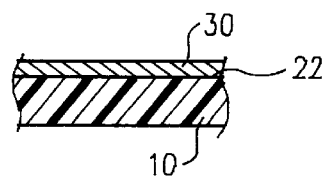
FIG. 3 is a side elevational view of taken along edge E of FIG. 2, showing the edge of stamper with a cured film thereabove, as opened up utilizing a scraping tool along the edge of the stamper.

In the event it is attempted to remove the coating film 30 before it has adequately cured, portions of the coating film 30 will remain on the stamper 10. In such cases, it is possible to simply repeat the coating process described above to create a new film 30' (if required, see FIGS. 3 and 5) which may be removed after a full cure. With my novel cleaning method, the portions of film 30 which are left behind during an initial removal attempt will be easily removed when peeling a fully new film coating 30' from the stamper 10.

Storage of CD stampers with a coating film 30 thereon is possible, but not recommended, as generally such coatings are more difficult to remove after months of storage than is the case when freshly applied. Also, thin coatings of film 30 are not recommended, as they are more difficult to remove from surface 22 of stamper 10.

Preferably, the cleaning fluid 20 used in my novel cleaning process is manufactured utilizing as a primary active ingredient a curable elastomer. More preferably, a curable urethane emulsion is utilized. Most preferably, a moldable polyurethane elastomer is provided in the form of a urethane emulsion resin. I have found it advantageous to use a cleaning solution in which the principal component is comprised of urethane emulsion resin in the range of about 77.5 to 82.5 percent by weight, with a minor portion of the cleaning solution being water (at about 10.0 to 14.0 percent by weight), with the balance being a slight amount of butyl cellosolve (2-butoxy ethanol or $C_4H_9OCH_2CH_2OH$) solvent (of about 0.4 to 0.6 percent by weight), and a trace amount of surfactant/thickener—as wetting agent and for viscosity control—(in the amount of about 7.0 to 8.0 percent by weight). One supplier, Morton Automotive Coatings Division of Morton International, Inc., 2701 East 170th Street, Lansing, Ill. 60418, provides suitable moldable polyurethane formulations.

It will be readily apparent to the reader that the present invention may be easily adapted to other embodiments incorporating the concepts taught herein and that the present embodiments are provided by way of example only and not in any way a limitation. For example the cleaning solution provided may be used in a similar method for the cleaning of precision optical equipment, or for example, to clean eyeglasses. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalencies of the claims are therefore intended to be embraced therein.

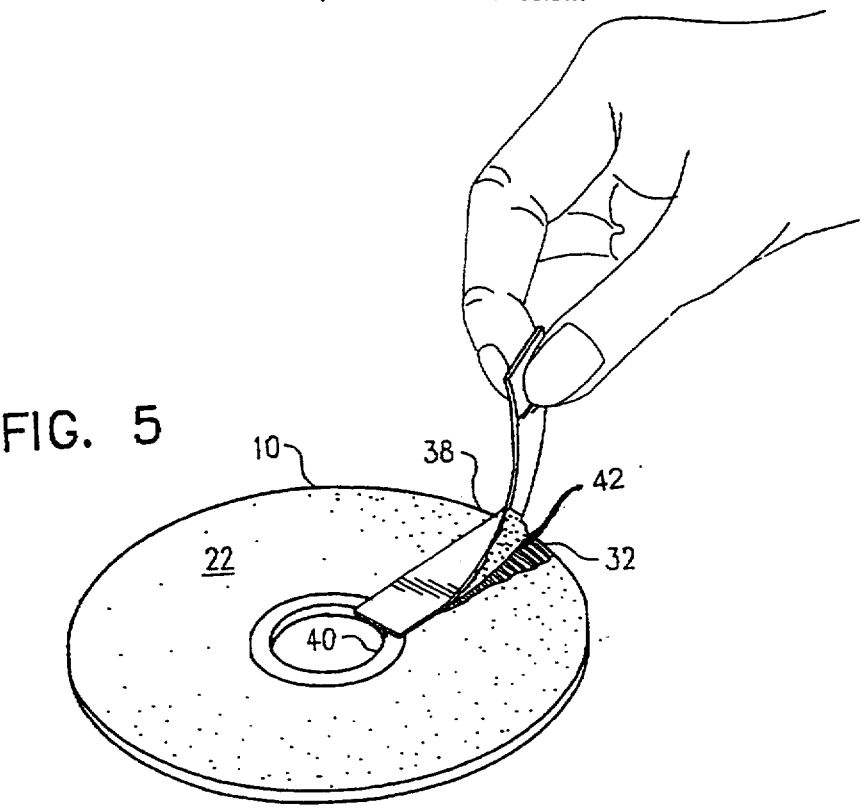

I claim:

1. A method for treating the optical surface of a precision optical component, said optical surface comprising an optically read pit structure, in order to remove foreign debris therefrom and to thereby increase the precision provided by the optical surface of the precision optical component, said method comprising:

contacting and coating the optical surface of said precision optical component with a curable, film forming cleaning solution;

curing said curable, film forming cleaning solution to form a dry, resilient film on the optical surface of said precision optical component, wherein said foreign debris becomes captured by said by resilient film; and removing said dry resilient film and said foreign debris from said optical surface of said precision optical component.

2. A method of cleaning a precision optical component to remove foreign debris therefrom, said method comprising:

coating said precision optical component with a curable, film forming cleaning solution;

curing said cleaning solution to form a dry, pliable film on said precision optical component, wherein said foreign debris becomes captured by said pliable film; and removing said dry, pliable film from said precision optical component.

3. The method as set forth in claim 1 or claim 2, wherein said precision optical component comprises a compact disc.

4. The method as set forth in claim 1 or claim 2, wherein said precision optical component comprises a compact disc stamper.

5. The method as set forth in claim 1 or claim 2, wherein said precision optical component is selected from the group consisting of (a) a compact disc master, (b) a compact disc father, or (c) a compact disc mother.

6. The method as set forth in claim 2, wherein said precision optical component comprises an optical lens.

7. The method as set forth in claim 2, wherein said precision optical component comprises eyeglasses.

8. The method as set forth in claim 1 or claim 2, wherein the step of removing said dry film accomplished manually.

9. The method as set forth in claim 1 or claim 2, wherein said curable, film forming cleaning solution comprises a urethane emulsion solution.

10. The method as set forth in claim 8, wherein the step of curing further comprises the step of heating said precision optical component to a temperature greater than 100° F.

11. The method as set forth in claim 1 or claim 2, wherein the step of coating said precision optical component further comprises the step of spinning said precision optical component during said coating step.

12. The method as set forth in claim 1 or claim 2, wherein the step of removing said dry film from said precision optical component further comprises the step of delaminating said film from said precision optical component along an outer edge portion of said precision optical component.

13. The method as set forth in claim 12, wherein said outer edge portion which is delaminated has a length from about one and one-half inches to about two inches.

14. The method as set forth in claim 1, or in claim 2, wherein the step of removing said dry film from said precision optical component further comprises the steps of (a) applying an adhesive tape to said dry film, and then (b) pulling said adhesive tape so as to delaminate said dry film from said precision optical component.

15. The method as set forth in claim 2, wherein said curable film forming cleaning solution comprises a urethane emulsion resin.

16. The method as set forth in claim 15, wherein said curable film forming cleaning solution comprises about seventy seven point five (77.5) to about eighty two point five (82.5) percent by weight of said urethane emulsion resin.

17. The method as set forth in claim 15, wherein said curable film forming cleaning solution further comprises a butyl cellusolve solvent.

18. The method as set forth in claim 17, wherein said curable film forming cleaning solution further comprises about zero point four (0.4) to about zero point six (0.6) percent by weight of butyl cellusolve solvent.

19. The method as set forth in claim 15, wherein said curable film forming cleaning solution further comprises a surfactant and thickener.

20. The method as set forth in claim 15, wherein said curable film forming cleaning solution further comprises about seven (7.0) to eight (8.0) percent by weight surfactant and thickener.

21. The method as set forth in claim 15, wherein said curable film forming cleaning solution further comprises water.

22. The method as set forth in claim 15, wherein said curable film forming cleaning solution comprises about ten (10.0) to about fourteen (14.0) percent water by weight.

23. The method as set forth in claim 2, wherein said curable film forming cleaning solution is cured to form a clear pliable film on said precision optical component.

* * * * *

UNITED STATES PATENT AND TRADEMARK OFFICE
CERTIFICATE OF CORRECTION

PATENT NO. : 5,810,941
DATED : Sep. 22, 1998
INVENTOR(S) : MOYNAGH, Kelan Thomas It is certified that error appears in the above-identified patent and that said Letters Patent is hereby corrected as shown below:

Column 2, line 5: delete [manufacture] and substitute therefore --manufactured--.
Column 2, line 59: delete [us ed] and substitute therefore --used--.
Column 4, line 32: after the word "provided" insert --to--.
Column 5, line 6: after the words "(not shown)" insert --.--.

Signed and Sealed this

Second Day of May, 2000

Q. TODD DICKINSON

*Attest:*

*Attesting Officer*     *Director of Patents and Trademarks*

UNITED STATES PATENT AND TRADEMARK OFFICE
CERTIFICATE OF CORRECTION

Page 2 of 2

PATENT NO. : 5,810,941
DATED : Sep. 22, 1998
INVENTOR(S) : MOYNAGH, Kelan Thomas It is certified that error appears in the above-identified patent and that said Letters Patent is hereby corrected as shown below:

IN THE DRAWINGS:
    Remove "FIG. 5" and replace with "FIG. 5" below.